(12) United States Patent
Boos

(10) Patent No.: US 8,181,305 B2
(45) Date of Patent: May 22, 2012

(54) WINDSHIELD WIPER DEVICE

(75) Inventor: Tino Boos, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 1130 days.

(21) Appl. No.: 11/915,586

(22) PCT Filed: Jul. 31, 2006

(86) PCT No.: PCT/EP2006/064827
§ 371 (c)(1),
(2), (4) Date: Nov. 27, 2007

(87) PCT Pub. No.: WO2007/020175
PCT Pub. Date: Feb. 22, 2007

(65) Prior Publication Data
US 2008/0201890 A1 Aug. 28, 2008

(30) Foreign Application Priority Data
Aug. 18, 2005 (DE) .......................... 10 2005 039 110

(51) Int. Cl.
B60S 1/04 (2006.01)
B60S 1/06 (2006.01)
B60S 1/16 (2006.01)

(52) U.S. Cl. .............. 15/250.31; 15/250.3; 403/DIG. 3; 384/276; 384/281; 384/624

(58) Field of Classification Search .................. 15/250.3, 15/250.31, 250.27, 250.14; 403/2, DIG. 3; 384/276, 281, 624
See application file for complete search history.

(56) References Cited

U.S. PATENT DOCUMENTS

| 6,196,754 | B1 * | 3/2001 | Bruemmer et al. | 403/279 |
| 6,347,427 | B2 | 2/2002 | Kobayashi et al. | |
| 6,513,186 | B1 * | 2/2003 | Zimmer | 15/250.31 |
| 6,594,853 | B1 * | 7/2003 | Igarashi | 15/250.31 |
| 6,941,611 | B2 * | 9/2005 | Kashiwagi et al. | 15/250.31 |
| 7,185,390 | B2 * | 3/2007 | Buchanan, Jr. | 15/250.31 |

FOREIGN PATENT DOCUMENTS

| EP | 0916559 A2 | 5/1999 |
| EP | 1103434 A1 | 5/2001 |
| JP | 55047059 A | 4/1980 |
| JP | 60139529 U | 9/1985 |
| JP | 1136056 U | 9/1989 |
| WO | WO2005/000644 | * 1/2005 |

OTHER PUBLICATIONS

PCT/EP2006/064827 International Search Report.

* cited by examiner

Primary Examiner — Gary Graham
(74) Attorney, Agent, or Firm — Michael Best & Friedrich LLP

(57) ABSTRACT

The invention relates to a windshield wiper device, particularly for a motor vehicle, comprising at least one wiper shaft (10). Prior art windshield wiper devices having predetermined breaking points exist in order to meet the high demands of pedestrian impact protection. However, the risk of these predetermined breaking points rupturing during the operation of the wiper exists in this type of windshield wiper device. In addition it cannot be guaranteed that the predetermined breaking point ruptures in the event of a pedestrian impact. Therefore, in the inventive windshield wiper device, the at least one wiper shaft (10) can be displaced under the action of a force.

20 Claims, 4 Drawing Sheets

WINDSHIELD WIPER DEVICE

BACKGROUND OF THE INVENTION

The invention relates to a windshield wiper device, in particular for a motor vehicle, comprising at least one wiper shaft.

Nowadays, high requirements are being placed on windshield wiper devices with respect to pedestrian impact protection. No parts that represent a risk of injury to the pedestrian may project from the vehicle. For this reason, there are windshield wiper devices with predetermined breaking points so that the windshield wiper device yields from the danger zone in an impact with a pedestrian. The predetermined breaking points are provided in an area of an attachment between a wiper bearing and a vehicle body. The disadvantage of this, however, is that the predetermined breaking points lie in the main load area of the wiper bearing, thereby also stressing the predetermined breaking points during wiper operation. The strength and the rigidity of the predetermined breaking points depend upon the material properties and the manufacturing process as well as upon their geometric design. Thus, for example, the composition of the alloy and the injection parameters cause a considerable dispersion of the strength and rigidity values, because of the formation of voids and the like. As a result, there is a risk that should not be disregarded that the predetermined breaking point will already fail during wiper operation, thereby causing the windshield wiper device to break down. In addition, in the case of a pedestrian impact, it is not possible to guarantee that the predetermined breaking points will rupture.

SUMMARY OF THE INVENTION

The objective of the invention is improving a windshield wiper device of the type cited at the outset to the effect that the high requirements for pedestrian impact protection are fulfilled, and, at the same time, trouble-free operation of the windshield wiper device is guaranteed.

The invention attains the stated objective with a windshield wiper device of the type cited at the outset, in which, in accordance with the invention, the at least one wiper shaft can be displaced under the action of a force. When a pedestrian makes impact with the windshield wiper device the wiper shaft yields to the impact force so that the windshield wiper device does not represent a risk of injury to the pedestrian. As a result, the windshield wiper device fulfills the high requirements for pedestrian impact protection. Because the windshield wiper device dispenses with a predetermined breaking point, trouble-free wiper operation is made possible while simultaneously meeting the requirements for pedestrian impact protection.

The at least one wiper shaft can be locked in the axial direction. As a result, displacement of the wiper shaft in the axial direction during wiper operation is precluded. Only when there is an impact with the wiper shaft does the locking mechanism detach so that the wiper shaft can be displaced in the axial direction.

In a preferred embodiment, the at least one wiper shaft is inserted into a sleeve, which is axially displaceable relative to a molded tube and lockable. This is a relatively simple design, with which the features in accordance with the invention can be realized in a cost-effective manner. If the wiper shaft is connected in a fixed manner with the sleeve, the wiper shaft and the sleeve can be displaced jointly out of the danger zone in the case of an impact, wherein the wiper shaft and the sleeve move relative to the molded tube.

A locking device can have an indentation in the sleeve, in which a locking element engages. In this way, the triggering force can be adjusted exactly to a specific value, which, when reached, the locking mechanism will detach and the wiper shaft is displaced.

Another possibility to adjust the triggering force exactly to a specific value is pressing the locking element with a spring element into the indentation. The initial stress of the spring element then determines the triggering force.

Furthermore, the triggering force is a function of the shape of the locking element. Depending upon the desired level of the triggering force, the locking element can be a sphere, an ellipsoid or a wedge.

If the spring element is embodied as a spiral spring, as a rubber molded part, as a cantilever beam spring or the like, sufficiently high compressive forces can be generated on a very limited installation space. These types of springs therefore guarantee that the wiper shaft functions in a trouble-free manner during wiper operation without being axially displaced.

The spring element and the locking element can be embodied as a single piece. Assembly of the spring element and the locking element is simplified as a result.

If the spring element and the locking element are a punched bent part, they can be manufactured cost-effectively in large unit numbers.

The locking mechanism can be provided in the region of holding eye and/or crimp pin attached to the molded tube. Then no additional installation space is required for the locking mechanism.

So that the locking device does not release the locking mechanism by an unintentional rotation of the sleeve, the sleeve can be secured against rotation around its own axis.

The sleeve can be secured against rotation around its own axis is a very simple and therefore cost-effective manner if the sleeve has at least one longitudinal wedge.

The sleeve and/or the molded tube can be manufactured of a diecast material. Diecast materials have a high level of time dimensional stability thereby guaranteeing trouble-free function during the complete service life of the windshield wiper device.

BRIEF DESCRIPTION OF THE DRAWINGS

In the following, one exemplary embodiment will be explained in more detail on the basis of the enclosed drawings.

The drawings show in detail.

DETAILED DESCRIPTION

Figure 1:
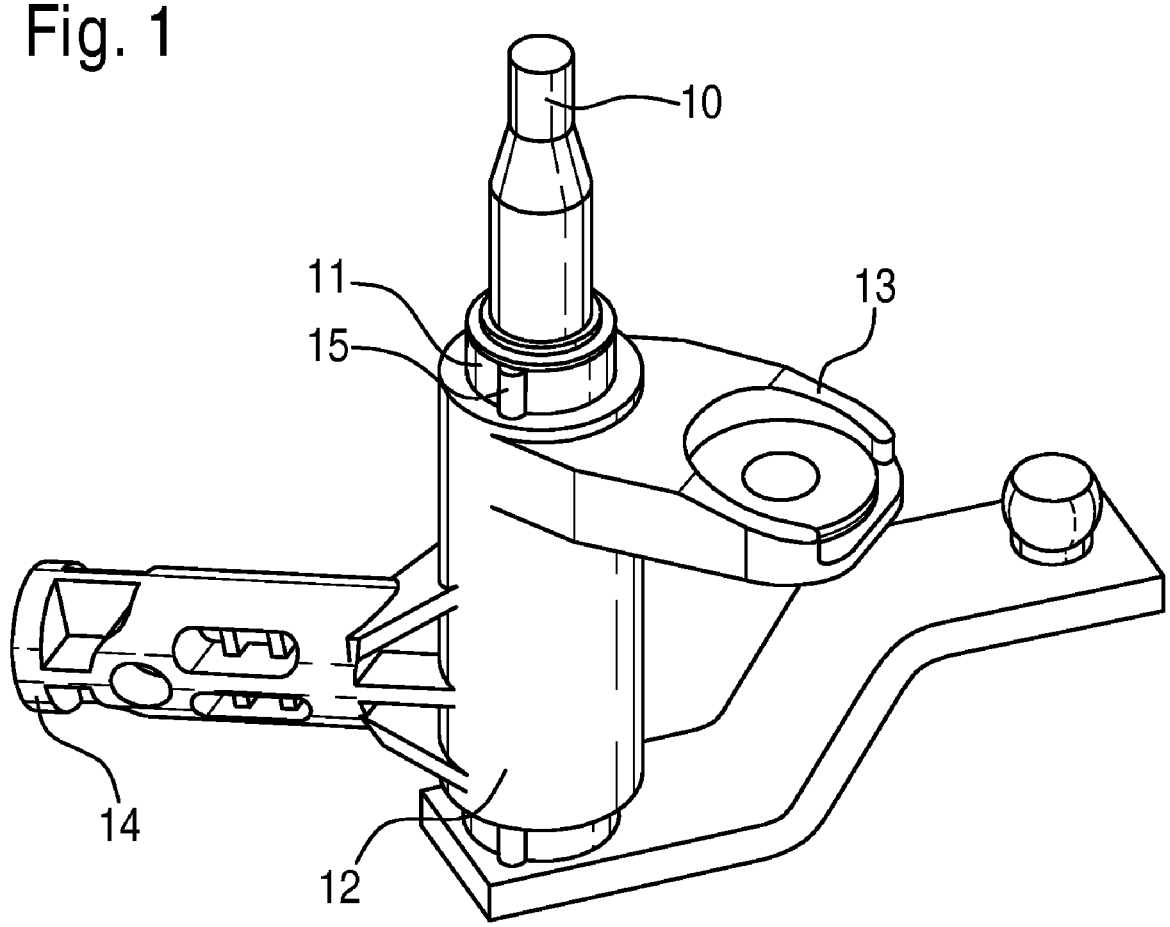
FIG. 1 A perspective view of a molded type with a wiper shaft
Figure 2:
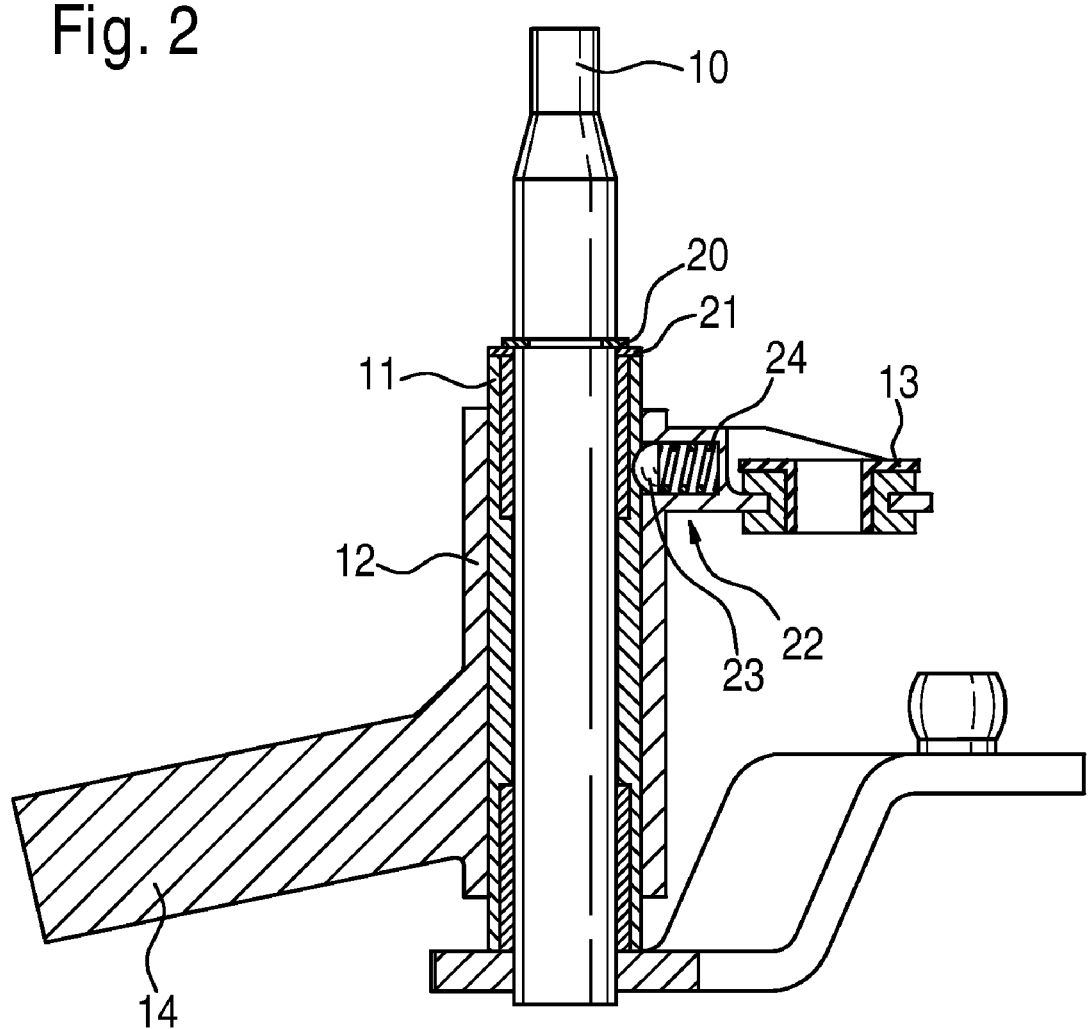
FIG. 2 A sectional view of the molded tube and the wiper shaft from FIG. 1 with a first embodiment of a locking device FIG. 3 A sectional view of a second embodiment of the locking device FIG. 4 A sectional view of a third embodiment of the locking device FIG. 5 A sectional view of a fourth embodiment of the locking device FIG. 6 A sectional view of a fifth embodiment of the locking device

FIGS. 1 and 2 show a wiper shaft 10, which is inserted into a sleeve 11. The sleeve 11 is inserted into a molded tube 12. Arranged on the molded tube 12 is a holding eye 13, which can be used for mounting the molded tube 12 to a vehicle body (not shown here in greater detail). Moreover, a crimp pin 14 is arranged on the molded tube 12, which can be inserted into a tubular plate (also not shown).

The sleeve 11 together with the wiper shaft 10 is displaceable in the axial direction relative to the molded tube 12. As a result, the wiper shaft 10 can be displaced downwardly in a pedestrian impact with the wiper shaft 10, thereby reducing the risk of injury to the pedestrian.

The wiper shaft 10 is connected to the sleeve 11 in the axial direction in a fixed manner by a securing ring 20 and a washer 21 arranged beneath it (see FIG. 2). As a result, the wiper shaft 10 and the sleeve 11 always execute axial displacements jointly.

The sleeve 11 has a longitudinal wedge 15 (see FIG. 1), which secures the sleeve 11 against a rotation around its own axis.

A locking device 22 has an indentation in the sleeve, into which a locking element 23 engages. The locking element 23 is pressed into the indentation by a spring 24.

The locking element 23 is designed as a hemisphere and the spring 24 as a spiral spring.

The locking device 22 is provided in the region of the holding eye 13, thereby accommodating the locking device 22 is a space saving manner.

Figure 3:
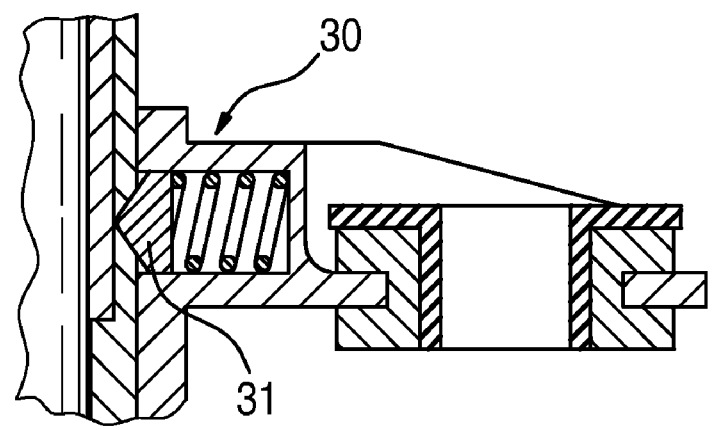

FIG. 3 shows a locking device 30, in which a locking element 31 is embodied in a wedge-shaped manner. The triggering force is greater with the wedge-shaped locking element 31 than with the hemispherical locking element 23 (see FIG. 2).

Figure 4:
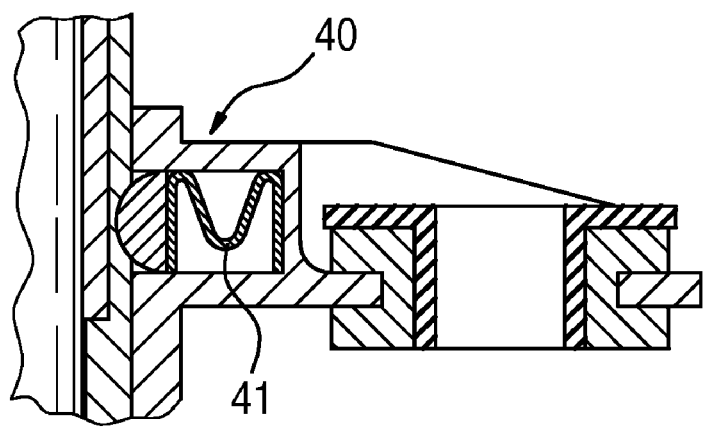

FIG. 4 shows a locking device 40, in which a spring 41 is embodied as a cantilever beam spring. It can be used to generate relatively high compressive forces on a small space making it possible to achieve high triggering forces with the spring 41.

Figure 5:
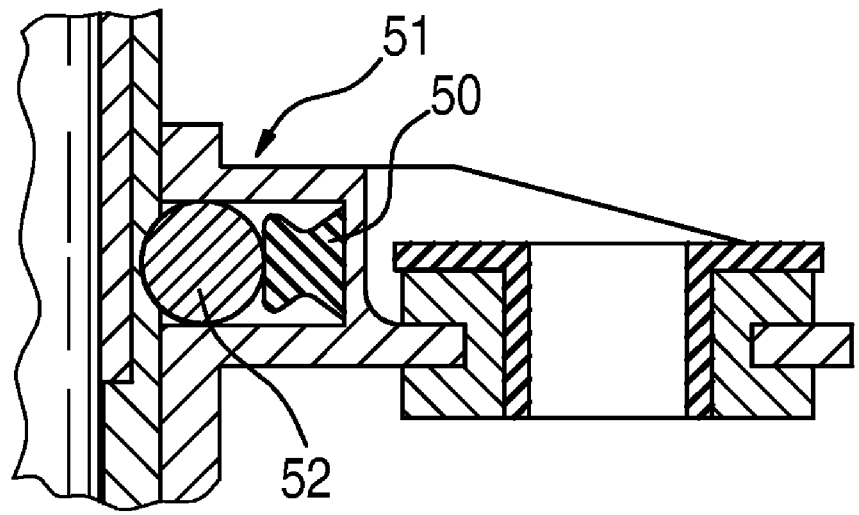
Figure 6:
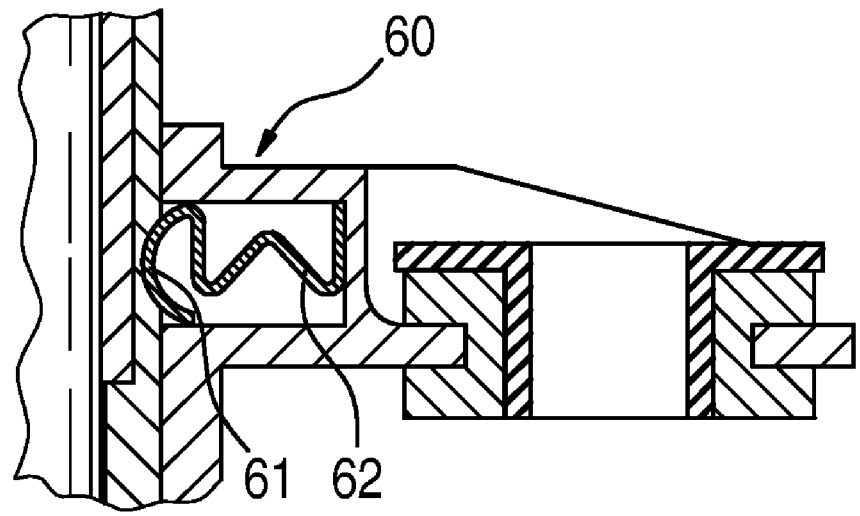

High compressive forces can also be generated on a small space with a spring 50 embodied as a rubber molded part of a locking device 51 (see FIG. 5). A locking element 52 can then be embodied advantageously as a sphere.

Furthermore, it is possible in the case of a locking device 60 for the locking element 61 and the spring element 62 to be embodied as a single piece. The single-piece design simplifies assembly of the locking element 61 and the spring element 62. The locking element 61 and the spring element 62 can be manufactured advantageously as a punched bent part, thereby making it possible to manufacture them in large unit numbers in a cost-effective manner.

The invention claimed is:

1. Windshield wiper device, comprising at least one wiper shaft (10), characterized in that the wiper shaft (10) is inserted into a sleeve (11), the wiper shaft (10) and the sleeve (11) being displaceable along an axis relative to a molded tube (12) under the action of a force and lockable by a locking device (22, 30, 40, 51, 60), the locking device (22, 30, 40, 51, 60) having an indentation in the sleeve (11) in which a locking element (23, 31, 52, 61) engages, and in that the locking element (23, 31, 52, 61) is pressed with a spring element (24, 41, 50, 62) into the indentation, the locking element and the spring element being separate from the molded tube, the molded tube defining a radial bore substantially perpendicular to the axis and at least partially receiving both the locking element and the spring element.

2. Windshield wiper device according to claim 1, characterized in that the at least one wiper shaft (10) is lockable in the axial direction.

3. Windshield wiper device according to claim 1, characterized in that the locking element (31, 52) includes one of a sphere, an ellipsoid and a wedge.

4. Windshield wiper device according to claim 1, characterized in that the spring element (24, 41, 50, 62) includes one of a spiral spring, a rubber molded part, and a cantilever beam spring.

5. Windshield wiper device according to claim 1, characterized in that the spring element (62) and the locking element (61) are formed as a single piece.

6. Windshield wiper device according to claim 5, characterized in that the spring element (62) and the locking element (61) are punched bent parts.

7. Windshield wiper device according to claim 1, characterized in that the locking device (22, 30, 40, 51, 60) is provided in a region of one of a holding eye (13) and a crimp pin (14) attached to the molded tube (12).

8. Windshield wiper device according to claim 1, characterized in that the sleeve (11) is secured against rotation around its own axis.

9. Windshield wiper device according to claim 8, characterized in that the sleeve (11) has at least one longitudinal wedge (15).

10. Windshield wiper device according to claim 1, characterized in that one of the sleeve (11) and the molded tube (12) is manufactured of a diecast material.

11. Windshield wiper device according to claim 1, characterized in that the locking element (23, 31, 52, 61) is pressed into the indentation radially by the spring element (24, 41, 50, 62).

12. Windshield wiper device, comprising at least one wiper shaft (10), characterized in that the wiper shaft (10) is inserted into a sleeve (11), the wiper shaft (10) and the sleeve (11) being axially displaceable relative to a molded tube (12) under the action of a force and lockable by a locking device (22, 30, 40, 51, 60), the locking device (22, 30, 40, 51, 60) having an indentation in the sleeve (11) in which a locking element (23, 31, 52, 61) engages, and in that the locking element (23, 31, 52, 61) has an end surface engageable with a surface of the indentation, at least one of the end surface of the locking element (23, 31, 52, 61) and the surface of the indentation being constructed to cause the locking element to move radially out of the indentation under the action of a force on the wiper shaft (10) to allow axial displacement of the wiper shaft (10), a holding eye (13) and a crimp pin (14) being fixed to the molded tube (12) and axially displaceable with the molded tube (12) relative to the wiper shaft (10) and the sleeve (11).

13. Windshield wiper device according to claim 12, characterized in that the locking element (23, 31, 52, 61) is pressed with a spring element (24, 41, 50, 62) into the indentation.

14. Windshield wiper device according to claim 13, characterized in that the locking element (31, 52) includes one of a sphere, an ellipsoid and a wedge providing the end surface.

15. Windshield wiper device according to claim 14, characterized in that the spring element (24, 41, 50, 62) includes one of a spiral spring, a rubber molded part, and a cantilever beam spring.

16. Windshield wiper device according to claim 13, characterized in that the spring element (62) and the locking element (61) are formed as a single piece.

17. Windshield wiper device according to claim 16, characterized in that the spring element (62) and the locking element (61) are punched bent parts.

18. Windshield wiper device according to claim 12, characterized in that the locking device (22, 30, 40, 51, 60) is provided in a region of one of the holding eye (13) and the crimp pin (14).

19. Windshield wiper device according to claim 12, characterized in that the sleeve (11) is secured against rotation around its own axis.

20. Windshield wiper device according to claim 19, characterized in that the sleeve (11) has at least one longitudinal wedge (15).

* * * * *